J. R. HAMMELL.
EQUALIZER FOR TRACTION PLOW HITCHES.
APPLICATION FILED MAY 4, 1912.

1,088,568.

Patented Feb. 24, 1914.

2 SHEETS—SHEET 1.

Witnesses:
Christ Feinle, Jr.
Dudley B. Howard

Inventor,
J. R. Hammell.
By Victor J. Evans,
Attorney.

COLUMBIA PLANOGRAPH CO., WASHINGTON, D. C.

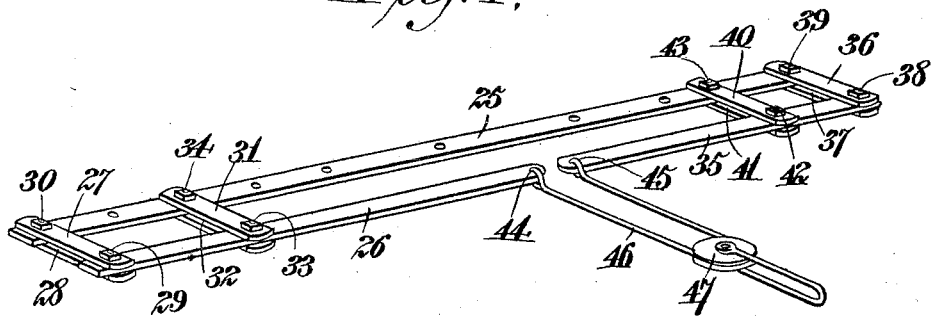
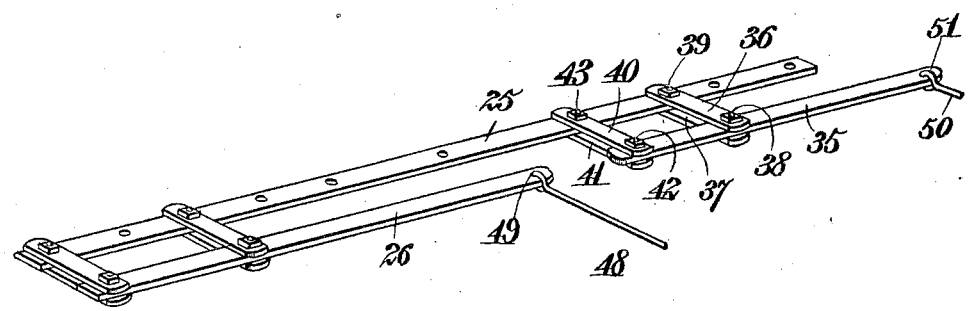

UNITED STATES PATENT OFFICE.

JOHN R. HAMMELL, OF ILIFF, COLORADO.

EQUALIZER FOR TRACTION-PLOW HITCHES.

1,088,568.  Specification of Letters Patent.  Patented Feb. 24, 1914.

Application filed May 4, 1912. Serial No. 695,074.

*To all whom it may concern:*

Be it known that I, JOHN R. HAMMELL, a citizen of the United States, residing at Iliff, in the county of Logan and State of Colorado, have invented new and useful Improvements in Equalizers for Traction-Plow Hitches, of which the following is a specification.

My invention relates to draft equalizers for traction plow hitches, the main object being to provide a device which will allow lateral deflection in the path of the plows and will equalize the draft accordingly.

An object of the invention is the provision of a pair of equalizing bars which may be used jointly with one plow or individually in connection with two or more plows traveling in parallel courses.

Further objects of the invention will appear as the following specific description is read in connection with the accompanying drawings which form a part of the application, and in which—

Figure 1:
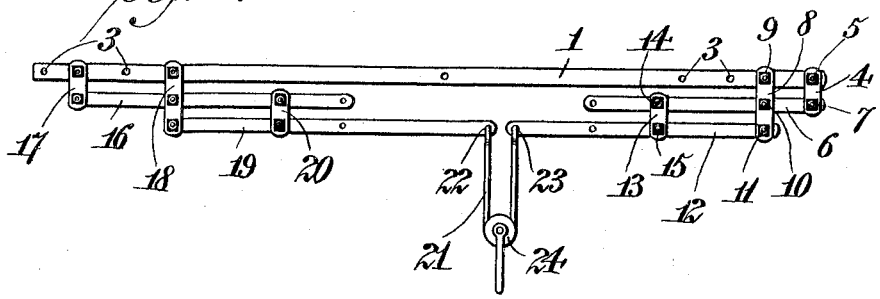
Figure 2:
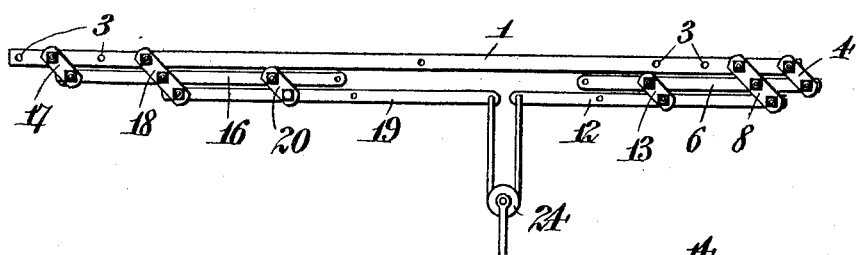
Figure 3:
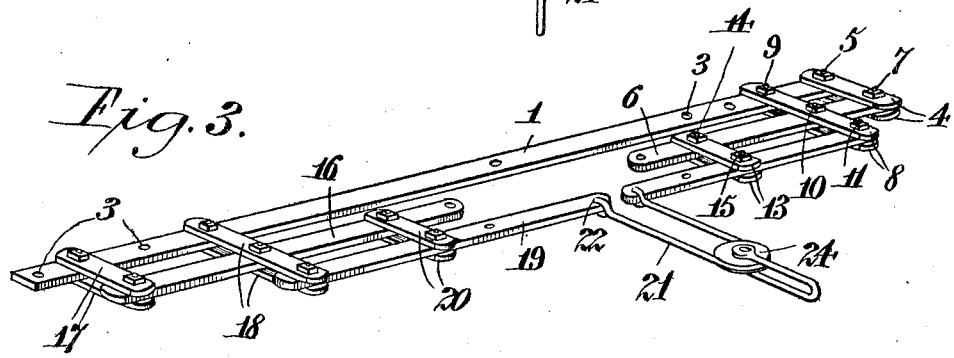

Figure 1 is a plan view of the device in normal position. Fig. 2 is a similar view with the line of draft on the plows changed. Fig. 3 is a perspective view of the device in the former position. Fig. 4 is a perspective view of a modified form of the device set for a single plow. Fig. 5 is a similar view showing the levers set for a pair of spaced plows.

Referring to the drawings, the numeral 1 designates the hitch bar which is rigidly secured to the rear end of the tractor. An even number of equally spaced vertical openings 3 are provided adjacent each extremity of the hitch bar 1. A pair of superposed link members 4 embrace one end of the bar 1 and have their forward ends pivoted thereto at the extreme opening 3 therein by means of a bolt 5. The rear ends of the link members 4 are pivoted to the outer extremity of a primary equalizing bar 6 by means of the pivot bolt 7. A second pair of superposed link members 8 have their forward ends pivoted to the hitch bar 1 at the second opening therein by the pivot bolt 9. The primary bar 6 is mounted between the link members 8 and is pivoted to the same intermediate of their ends by a pivot bolt 10. The members 8 have their rearward ends pivoted by means of the bolt 11 to the outer end of a secondary equalizing bar 12. A third pair of link members 13 is pivotally connected to the inner portions of the equalizing bars 6 and 12 by means of the bolts 14 and 15 respectively.

A second primary equalizing bar 16, longer than the bar 6, is secured to the hitch bar 1 adjacent its opposite extremity by means of the similar sets of link members 17 and 18, and by suitable pivot bolts. These link members are farther separated than the previously described sets, being pivoted at alternate openings 3 in the hitch bar. A second secondary bar 19 is pivoted to the rearward extremities of the link members 18 and is connected intermediate its length to the inner portion of the bar 16 through the medium of the embracing link members 20. This secondary bar 19 is greater in length than the coacting bar 12, so that their inner extremities nearly meet at a point which is shown in the drawing to be considerably to the right of the point of connection between the hitch bar 1 and the draw bar of the tractor. A flexible member 21 has its ends secured to the inner extremities of the coacting secondary bars, as at 22 and 23, and passes through a pulley 24, which is in turn suitably secured to the plows. The relative positions of the primary equalizing bars with respect to the hitch bar 1 may be varied by pivoting the attaching link members at a different set of openings in the hitch bar. These equalizing bars may be reversed, when it is desired to have the plows operate on the opposite side of the point of connection between the hitch bar and draw bar of the tractor, by pivoting their attaching link members at the proper openings in the opposite end of the hitch bar.

Figs. 4 and 5 show a slightly modified form of my invention, in which the numeral 25 designates the hitch bar similar in construction to the hitch bar 1 in Figs. 1 to 3 inclusive. In Fig. 4 in particular, an equalizing member 26 has its outer end secured to one end of the hitch bar 25 by means of the embracing link members 27 and 28 which are pivoted to the equalizing member and to the hitch bar by pivot bolts 29 and 30 respectively. The inwardly extending portion of the equalizing bar 26 is connected to the hitch bar by the superposed link members 31 and 32, whose ends are pivotally connected to the equalizing bar and the hitch bar by pivot bolts 33 and 34. A second equalizing bar 35 has its outer end connected to the opposite extremity of the hitch bar by the link members 36 and 37, whose points of pivotal attachment to the bar 35 and the hitch bar 25 are at the bolts 38 and 39. A similar set of link members 40 and 41 are pivoted to the equalizing bar 35 and to the hitch bar 25 by bolts 42 and 43. The inner ends of both equalizing bars are located in suitable proximity to each other and have secured to their ends, as at 44 and 45, the ends of a flexible member 46. This member 46 passes around a pulley 47 which is adapted to be removably secured to the gang plow. In Fig. 5 the different parts of the device which have been described in connection with Fig. 4 are here used, but with a different arrangement of the equalizing bars. The equalizing bar 35 is here shown with its inner end pivotally connected to the hitch bar 25 at an intermediate opening therein by means of the link members 40 and 41 by the pivot bolts 42 and 43, this end of the equalizing bar 35 being located adjacent the inner attaching end of the bar 26. The link members 36 and 37 are pivoted to the equalizing bar 36 and the hitch bar 25 by means of the pivot bolts 38 and 39 adjacent the link members 40 and 41. A flexible member 48 has one end secured to the inner end of the equalizing bar 26 at 49 and its outer end secured to a gang plow. A second flexible member 50 has its forward end secured to the outer end of the bar 35 as at 51 and its other end is attached to a second gang plow, which is adapted to travel in a course parallel to that of the first gang plow.

In constructing an equalizer for traction plow hitches in accordance with the principle involved in the above described modified forms of my invention, the plow hitch may be constructed of sufficient length only to afford the desired rigidity to the hitch so that it will not become engaged with the wheels of the tractor, and the equalizer bars may be employed in such a manner that one or more gang plows may be connected with the hitch bar in suitable spaced relation to either end thereof. Upon reference to Fig. 5, it will be seen that, if the bar 26 were extended reversely with its free end projecting outwardly with respect to the hitch bar 25, the ends of the latter might be disposed between the wheels of the tractor while the plows were disposed at one side of the path of movement of the same.

I claim:—

1. A device of the class described comprising a hitch bar, an equalizing bar, link members pivotally connecting spaced parts of the equalizing bar to the hitch bar at spaced points thereon, and plow attaching means carried by one end of the said equalizing bar.

2. A device of the class described comprising a hitch bar, an equalizing bar disposed substantially parallel to the hitch bar, link members pivotally connecting spaced parts of the equalizing bar to the hitch bar at spaced points thereon, a second equalizing bar disposed in substantially parallel relation to the hitch bar and spaced longitudinally from the first-named equalizing bar, link members connecting spaced parts of the second equalizing bar to the hitch bar at spaced points thereon, and plow attaching means connected with one end of each equalizing bar.

3. A device of the class described comprising a hitch bar, an equalizing bar disposed substantially parallel to the hitch bar, link members pivotally connecting spaced parts of the equalizing bar to the hitch bar at spaced points thereon, a second equalizing bar disposed in substantially parallel relation to the hitch bar and spaced longitudinally from the first-named equalizing bar, link members connecting spaced parts of the second equalizing bar to the hitch bar at spaced points thereon, and a flexible plow attaching member having one of its ends connected to one end of each equalizing bar.

4. A device of the class described comprising a hitch bar, an equalizing bar disposed substantially parallel to the hitch bar, link members pivotally connecting spaced parts of the equalizing bar to the hitch bar at spaced points thereon, a second equalizing bar disposed in substantially parallel relation to the hitch bar and spaced longitudinally from the first-named equalizing bar, link members connecting spaced parts of the second equalizing bar to the hitch bar at spaced points thereon, a flexible member having each of its ends connected to one end of each equalizing bar, and a plow attaching pulley engaged with the said flexible member.

In testimony whereof I affix my signature in presence of two witnesses.

JOHN R. HAMMELL.

Witnesses:
O. B. FAWCETT,
E. L. TRUAX.